(12) United States Patent
Durand et al.

(10) Patent No.: US 9,032,114 B2
(45) Date of Patent: May 12, 2015

(54) DIRECT MEMORY ACCESS CONTROLLER, CORRESPONDING METHOD AND COMPUTER PROGRAM

(75) Inventors: Yves Durand, Saint-Ismier (FR); Christian Bernard, Saint-Etienne de Crossey (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 413 days.

(21) Appl. No.: 13/395,557

(22) PCT Filed: Sep. 10, 2010

(86) PCT No.: PCT/FR2010/051887
§ 371 (c)(1),
(2), (4) Date: Mar. 12, 2012

(87) PCT Pub. No.: WO2011/030070
PCT Pub. Date: Mar. 17, 2011

(65) Prior Publication Data
US 2012/0173772 A1    Jul. 5, 2012

(30) Foreign Application Priority Data

Sep. 11, 2009  (FR) ...................................... 09 56261
Oct. 8, 2009  (FR) ...................................... 09 57034

(51) Int. Cl.
*G06F 13/28* (2006.01)
*G06F 5/00* (2006.01)
(52) U.S. Cl.
CPC ...................................... *G06F 13/28* (2013.01)
(58) Field of Classification Search
USPC ........................................................ 710/22
See application file for complete search history.

(56) References Cited

U.S. PATENT DOCUMENTS

| 5,686,917 A | 11/1997 | Odom et al. |
| 5,974,483 A | 10/1999 | Ray et al. |

(Continued)

FOREIGN PATENT DOCUMENTS

| EP | 0 933 926 | 10/2006 |
| EP | 1 962 181 | 8/2008 |
| FR | 2 827 995 | 1/2003 |

OTHER PUBLICATIONS

"Frame Handler with Dynamic Allocation of Buffer Space," IBM Technical Disclosure Bulletin, vol. 32, No. 6B, pp. 37-40, (Nov. 1, 1989).

(Continued)

*Primary Examiner* — Henry Tsai
*Assistant Examiner* — Dean Phan
(74) *Attorney, Agent, or Firm* — Oblon, McClelland, Maier & Neustadt, L.L.P.

(57) ABSTRACT

The invention relates to an access controller which comprises a module (24) for managing writing in a circular buffer (16), means (38) for storing a first read pointer (PL) and a second write pointer (PE), a module (30) for managing reading in the circular buffer (16), means (24, 30, 40) for blocking reading, respectively writing, means (38) for storing a read or write work pointer (PT) which is different from the first and second pointers (PL; PE), and means (24, 30, 40) for updating the wo: pointer (PT) according to a predetermined update logic.
The predetermined update logic comprises forward or backward movements of the work pointer (PT) inside the circular buffer (16), and the controller includes means for blocking the read or write work pointer if the read work pointer (PT) points outside a memory space reserved for reading or, respectively, if the write work pointer (PT) points outside a free memory space for writing.

16 Claims, 4 Drawing Sheets

(56) References Cited

U.S. PATENT DOCUMENTS

Figure 1:
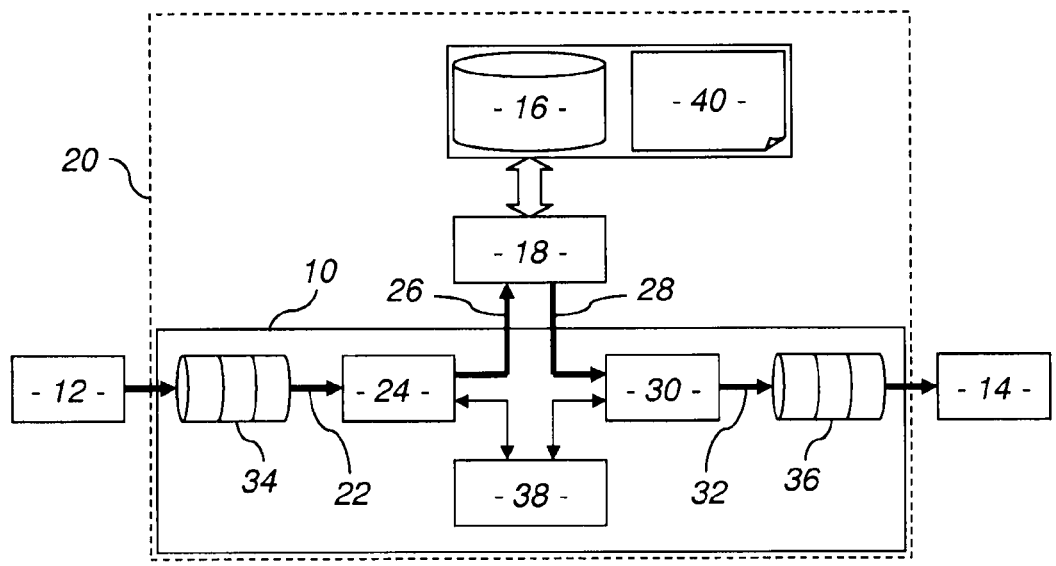

| | | | |
|---|---|---|---|
| 6,477,643 B1 * | 11/2002 | Vorbach et al. | 713/100 |
| 6,859,850 B1 | 2/2005 | MacCormack | |
| 2004/0008741 A1 | 1/2004 | Aoki | |
| 2010/0180095 A1 * | 7/2010 | Fujibayashi et al. | 711/163 |
| 2011/0087808 A1 | 4/2011 | Durand et al. | |

OTHER PUBLICATIONS

International Search Report Issued Dec. 8, 2010 in PCT/FR10/51887 Filed Sep. 10, 2010.

* cited by examiner

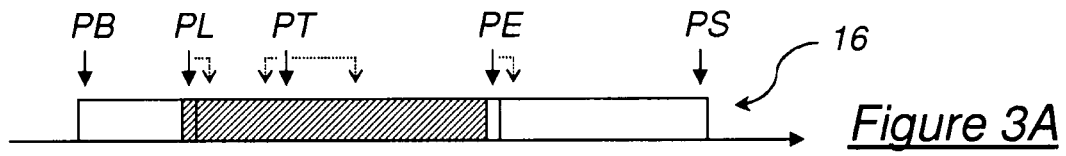
*Figure 3A*
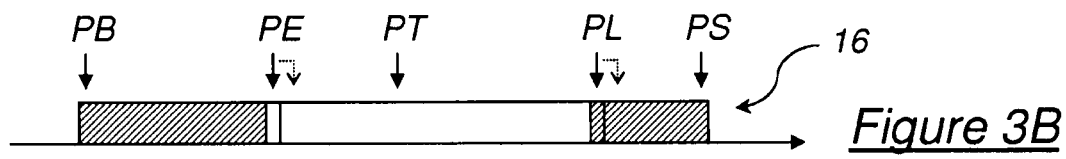
*Figure 3B*
*Figure 4*
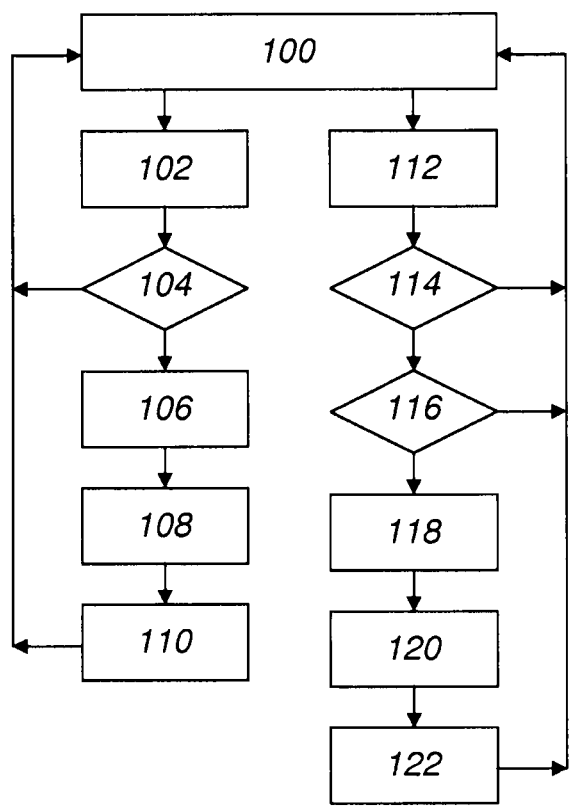

DIRECT MEMORY ACCESS CONTROLLER, CORRESPONDING METHOD AND COMPUTER PROGRAM

This invention relates to a direct memory access controller, a method for transferring data from at least one data source to at least one destination for this data implemented by this controller, and a corresponding computer program.

Such a controller, known as a DMA ("direct memory access") controller, is generally used in a device for processing data with a central processing unit, such as an integrated circuit. It also allows data that has been processed or provided by the central processing unit to be transferred, said data coming from or going to a peripheral device, such as a communication port, a hard drive, or any memory, between this peripheral device and a local memory of the device, without involving the central processing except for initiating and concluding the transfer.

A DMA controller is for example very useful in a system where rapid repeated hits to peripherals could otherwise nearly block or at least slow down the processing carried out by the central processing unit. Its presence optimizes the processing time of software applications executed by the central processing unit by allowing the DMA controller to manage the data transfers to and from the local memory.

The invention applies more particularly to a direct memory access controller for transferring data from at least one data source to at least one destination for this data, via a circular buffer memory comprising a predetermined number of successive elementary memory locations, each elementary location being identified by an address between a bottom address and a top address in the circular buffer memory, the access controller comprising a write management module designed for writing data received from the source into the circular buffer memory and means for storing a first read pointer and a second write pointer, said read pointer and said write pointer, respectively, indicating an elementary location of the circular buffer memory where data can be read or written.

Such a DMA controller is, for example, described in the European patent published under number EP 0 933 926. Its role is to write, into buffer memories, data that is successfully read by destination decoders with read access to these buffer memories. A write pointer, defined for each buffer memory, is incremented with an elementary memory location address during each write operation by the DMA controller for data in the corresponding buffer memory. Similarly, a read pointer, defined for each buffer memory, is incremented with an elementary memory location address during each read operation by one of the destinations for data in the corresponding buffer memory.

Each buffer memory occupies a memory space between a bottom address and a top address. The read and write pointers of a buffer memory are then incremented between the bottom address and the top address of this buffer memory and return to the bottom address by incrementing after reaching the top address. This is what qualifies these buffer memories as "circular buffer memories".

The advantage of this FIFO ("First In First Out") circular buffer memory configuration is that it avoids memory reallocation constraints if additional data is received, since everything happens as if it were possible to write data into such a FIFO memory buffer indefinitely as long as the address to which the write pointer points does not reach the address to which the read pointer points, meaning as long as the memory is not full.

But the circular buffer memory must be large enough so that it is never full during normal operation, which requires significant memory space to be reserved upfront for this circular memory.

A partial solution to this problem is provided by document EP 0 933 926. When one of the circular buffer memories is full and the DMA controller writes data to a location where data is stored that has not yet been read by the relevant destination, in other words, when the write pointer reaches or exceeds the read pointer for this circular buffer memory, an error is generated. But this solution is not satisfactory in most cases, because the initial data corresponding to the rewritten locations is then lost.

Moreover, this solution does not resolve when one of the destinations tries to read data even though the circular buffer memory associated with it is empty or the data it is storing is obsolete, in other words when the read pointer reaches or exceeds the write pointer for this circular buffer memory.

It may therefore be desirable to provide a direct memory access controller that can overcome the above problems and constraints.

The invention therefore relates to a direct memory access controller for transferring data from at least one data source to at least one destination for this data, via a circular buffer memory, the access controller comprising:
- a write management module designed to write data received from said at least one source in the circular buffer memory,
- means for storing a first read pointer and a second write pointer, said read pointer and write pointer, respectively, indicating an elementary location in the circular buffer memory where data can be read or written, respectively,
- a read management module designed to read data stored in the circular buffer memory and transfer it to said at least one destination, and
- means for blocking reading and writing, respectively, in the circular buffer memory based on the elementary locations indicated by said read and write pointers,
- means for storing a read or write work pointer different from the first and second pointers, and
- means for updating the work pointer, after each read or write carried out by this work pointer, according to a predetermined update logic, characterized in that the predetermined update logic comprises forward and backward movements of the work pointer inside the circular buffer memory, and in that the controller includes means for blocking the read or write work pointer if the read work pointer points outside a memory space reserved for reading defined from the read pointer to the address preceding the write pointer or, respectively, if the write work pointer points outside the free memory space for writing defined from the write pointer to the address preceding the read pointer.

Thus, the circular buffer memory performs a function of intermediary buffer with blocking reading/writing between the source and the destination. This function is managed by means of the read and write pointers by the direct memory access controller that has read and write access in this circular buffer memory. In this way, it is capable of synchronizing incoming data flow(s) (flows generated by the source(s)) with the outgoing data flow(s) (flows generated by the destination(s)) without having to synchronize with the central processing unit.

It is therefore also possible to consider even greater flexibility in reading and writing data in the circular buffer memory without the direct memory access controller losing its ability to synchronize the incoming and outgoing data flows.

Optionally, the means for updating the work pointer comprises means for executing an update firmware.

Firmware is onboard software in a hardware component, such as an integrated circuit, more specifically in the component's volatile or non-volatile memory.

Also optionally, the predetermined update logic comprises at least one address jump in the circular buffer memory.

Therefore, the circular buffer memory, whose direct memory access controller handles the reads and writes, is not used by the controller as a simple FIFO list. Using a predetermined program for updating the third read or write pointer according to a predetermined logic comprising at least one address jump, as opposed to a purely incremental logic, it is possible to change the data sequence, between their receipt from the source and their emission to the destination via the circular buffer memory.

Also optionally, the means for blocking reading are designed to block any data read in the circular buffer memory when an update to the read pointer causes the address to which it points to reach or exceed the address to which the write pointer points, and the means for blocking writing are designed to block any data write in the circular buffer memory when an update to the write pointer causes the address to which it points to reach or exceed the address to which the read pointer points.

Also optionally, the first read pointer is a read pointer that releases memory space to write data, and the work pointer is a read pointer that preserves the read data.

Also optionally, the firmware is designed to update only the first read pointer and the read work pointer, the write pointer being automatically updated by incrementation, without an address jump, at each operation to write data to the circular buffer memory.

Also optionally, the second write pointer is a write pointer that reserves memory space for reading data, and the work pointer is a write pointer.

Also optionally, the firmware is designed to update only the second write pointer and the write work pointer, the read pointer being automatically updated by incrementation, without an address jump, at each operation to read data in the circular buffer memory.

Also optionally, because the data transfer is intended for multiple destinations, for each destination, the storage means comprises a read work pointer, which is different from the first read pointer, the controller comprising means for updating the read work pointer of each destination, and the direct memory access controller comprises means for blocking a read work pointer if it points outside of a memory space reserved for reading defined from the first read pointer to the address preceding the write pointer.

Also optionally, because the data transfer is intended for multiple destinations, for each destination, the storage means comprises a first read pointer associated to a read work pointer, and the direct memory access controller comprises means for blocking each read work pointer if it points outside of a memory space reserved for reading defined from the first read pointer, associated with the considered read work pointer, to the address preceding the write pointer.

Also optionally, because the data transfer is intended from multiple sources, for each source, the storage means comprises a write work pointer, which is different than the second write pointer, and the access controller comprises means for blocking a write work pointer if it points outside of the free memory space for writing defined from the second write pointer to the address preceding the first read pointer.

Also optionally, because the data transfer is intended from multiple sources, for each source, the storage means comprises a second write pointer associated to a write work pointer, and the direct memory access controller comprises means for blocking each write work pointer if it points outside of the free memory space for writing defined from the second write pointer, associated to the considered write work pointer, to the address preceding the first read pointer.

Also optionally, the storage means comprises a write work pointer, which is different from the second write pointer, and a read work pointer, which is different from the first read pointer.

Also optionally, the predetermined update logic comprises forward and backward movements of the work pointer in the circular buffer memory.

The invention also relates to a method for transferring data from at least one data source to at least one destination for this data by a direct memory access controller according to the invention, comprising, each data received from the source being sent by the controller to a circular buffer memory and each data to be transmitted to the destination being read in the circular buffer memory by the controller, steps for blocking reading by the controller in the circular buffer memory and for blocking writing by the controller in the circular buffer memory based on relative elementary locations indicated by the read and write pointers, characterized in that it further comprises the following steps:

movements of the work pointer forward and backward in the circular buffer memory, blocking of the read or write work pointer if the read work pointer points outside of the memory space reserved for reading and defined from the read pointer to the address preceding the write pointer, or respectively, if the write work pointer points outside of the free memory space for writing defined from the write pointer to the address preceding the read pointer.

Finally, the invention also relates to a computer program that can be downloaded from a communication network and/or saved on a non-transitory computer-readable storage medium and/or executed by a direct memory access controller, comprising program code for executing the steps of a method for transferring data such as defined above, when said computer program is executed by the direct memory access controller.

Figure 2:
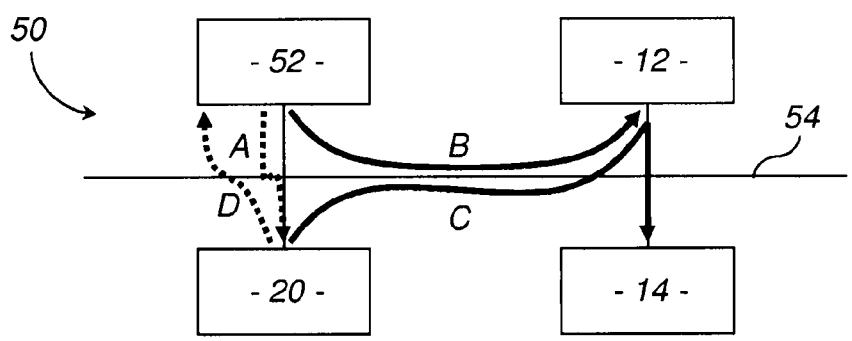
Figure 5:
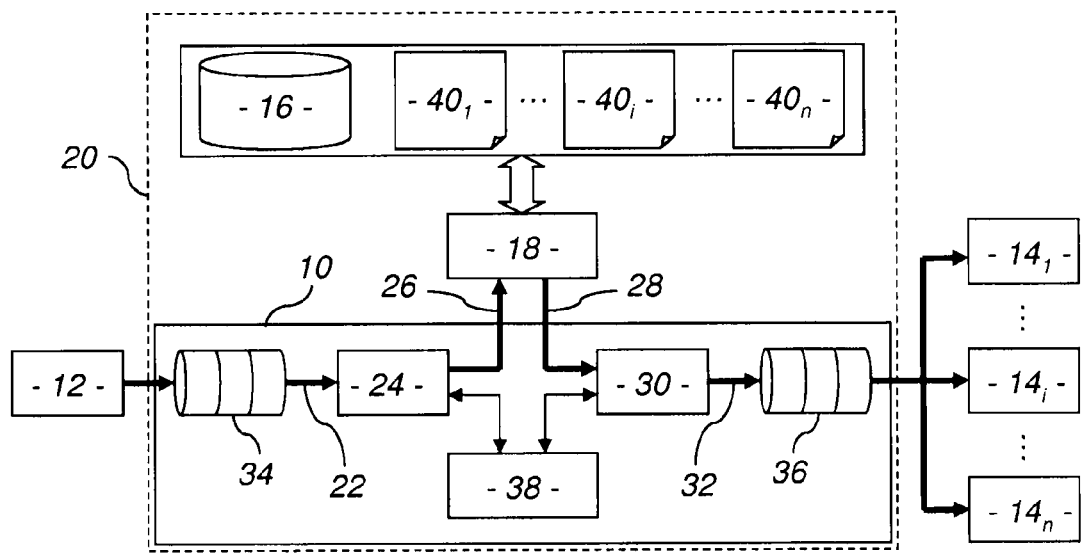
Figure 6:
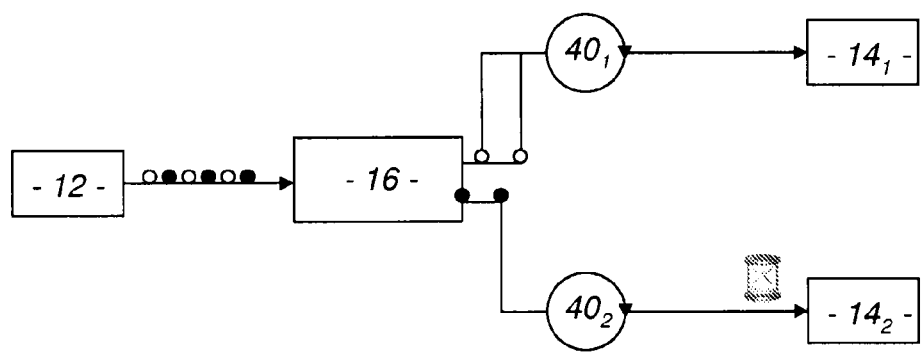
Figure 7:
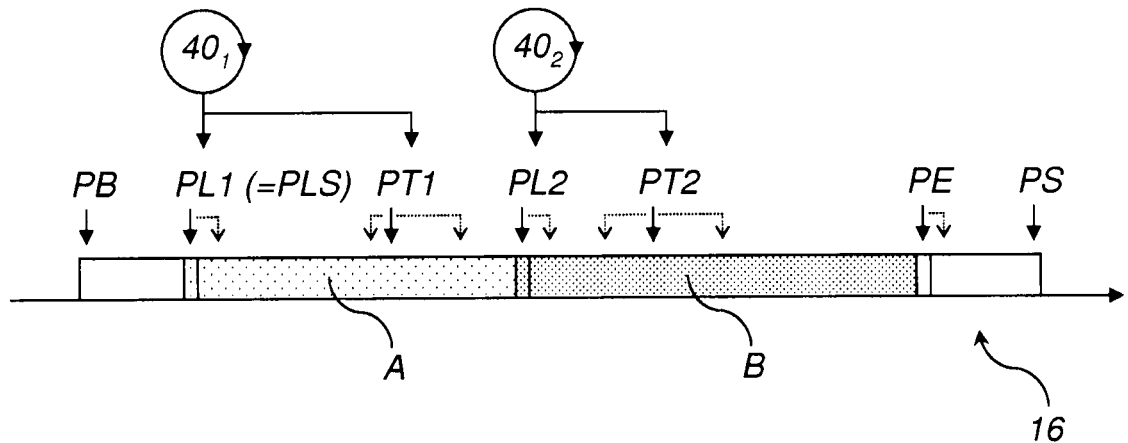
Figure 8:
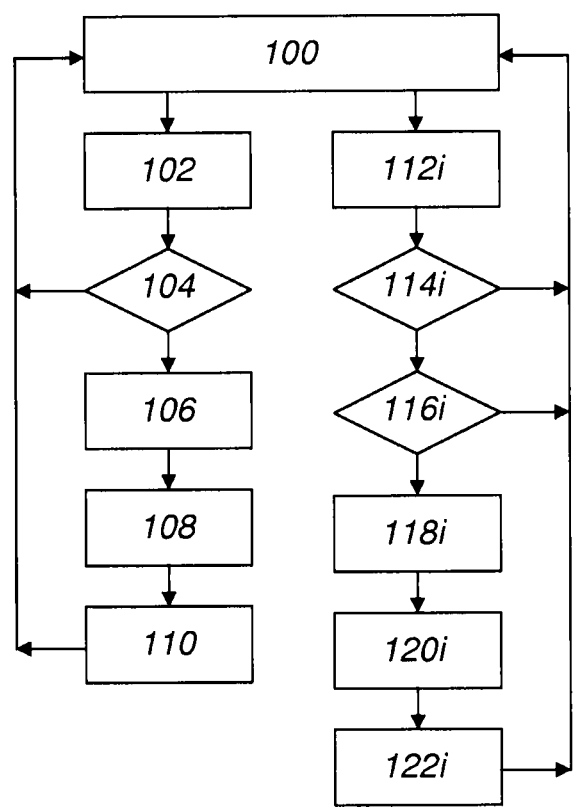

The invention will be better understood using the following description, given purely as reference and referring to the accompanying drawings, in which:

FIG. 1 schematically shows the general structure of a direct memory access controller according to a first embodiment of the invention, FIG. 2 schematically shows the general structure of a microprocessor integrated circuit comprising the direct memory access controller in FIG. 1, FIGS. 3A and 3B schematically show the structure of a circular buffer memory managed by the direct memory access controller in FIG. 1, FIG. 4 illustrates the successive steps of a method for transferring data according to an embodiment of the invention implemented by the direct access controller in FIG. 1, FIG. 5 schematically shows the general structure of a direct memory access controller according to a second embodiment of the invention, FIG. 6 schematically illustrates the advantageous operation of the direct memory access controller in FIG. 5 in a situation where a destination is blocked, FIG. 7 schematically shows the structure of a circular buffer memory managed by the direct memory access controller in FIG. 5, and FIG. 8 illustrates the successive steps of a method for transferring data implemented by the direct memory access controller in FIG. 5.

The purpose of the direct memory access controller or DMA controller 10 shown in FIG. 1 is to transfer data from at least one data source 12 to as least one destination 14 for that data via a circular buffer memory 16 comprising a predetermined number of successive elementary memory locations.

The DMA controller 16 is capable of having read and write access to the elementary locations of the circular buffer memory 16 by means of a module 18 for controlling data read and write access that interfaces between the DMA controller 10 and a storage medium including the circular buffer memory 16. Note that, in an alternate embodiment, the DMA controller, having the reference 20, includes the storage medium including the circular buffer memory 16 and the module 18 for controlling read and write access. In practice, it may be in the form of a standalone chip, such as a CMOS integrated circuit.

As a non-exclusive example of an implementation, according to a possible architecture known as NoC (Network-on-Chip), the DMA controller 10 or 20 is considered to consist of functional elements that communicate with one another by means of links of a packet switching network.

In accordance with this architecture for transferring data from the source 12 to the destination 14, the DMA controller 10 or 20 comprises the following elements:
- a link 22 for receiving data from the source 12,
- a module 24 for managing the writing of data by the controller 10 or 20 in the circular buffer memory 16, this module being activated by data it receives from the link 22,
- a link 26 for sending data to the circular buffer memory 16 for writing this data to elementary memory locations by means of the module 18 for controlling read and write access,
- a link 28 for receiving data from the circular buffer memory 16 for reading this data in elementary memory locations by means of the module 18 for controlling read and write access,
- a module 30 for managing the reading of data by the controller 10 or 20 in the circular buffer memory 16, capable of receiving data provided by the link 28, and
- a link 32 for sending read data to the destination 14.

With these elements, the DMA controller 10 or 20 sends each piece of data received from the source 12 to the circular buffer memory 16, each piece of data to be transmitted to the destination 14 then being read in the circular buffer memory 16 by the DMA controller 10 or 20. The circular buffer memory 16 thus serves as an intermediary buffer between the source 12 and the destination 14.

Optionally, the link 22 for receiving data includes a FIFO input buffer memory 34, allowing it to temporarily store data received from the source 12, even though the circular buffer memory 16 is blocked for writing because it is full.

Also optionally, the link 32 for sending read data includes a FIFO output buffer memory 36, allowing it to temporarily store data read in the circular buffer memory 16, even though the destination 14 is not yet ready to receive it or the output network is temporarily saturated.

To synchronize the incoming data flows in the DMA controller and the outgoing data flows from the DMA controller, this further comprises means 38 for storing descriptors of the circular buffer memory 16.

These descriptors comprise at least one bottom pointer PB pointing to a bottom address in the circular buffer memory 16 in its storage medium, a top pointer PS pointing to a top address in the circular buffer memory 16 in its storage medium, a write pointer PE pointing to an elementary location address in the circular buffer memory 16 where the next data received by the DMA controller 10 or 20 can be written, and a read pointer PL pointing to an elementary location address in the circular buffer memory 16 where the next data can be read to be transmitted to the destination.

Because the buffer memory 16 is a circular memory whose size is defined by the number of elementary locations between the bottom and top addresses, designated by the pointers PB and PS, each elementary location in this memory, to which the read and write pointers PL and PE may point, is identified by an address between the bottom address and the top address.

The bottom and top pointers PB and PS are predetermined and meant to remain constant, while the read and write pointers PL and PE are variable and intended to be updated, such as by incrementing an elementary location going from the bottom to the top, following a reading or writing operation in the circular buffer memory.

As indicated above, the circularity of this buffer memory 16 is related to the fact that, when a read or write pointer reaches the memory's top address, incrementing the pointer for one elementary location causes it to point to the memory's bottom address.

Accordingly, the data that is temporarily stored in the circular buffer memory 16 and waiting to be read by the DMA controller 10 or 20 to be transmitted to the destination 14 is between the address of the read pointer PL and the address preceding that of the write pointer PE, going from the bottom to the top. However, the memory space in the circular buffer memory between the address of the write pointer PE and the address preceding that of the read pointer PL, going from the bottom to the top, is a free space for writing. This structure for the circular buffer memory 16 associated to the descriptors PB, PS, PE, and PL is illustrated in FIGS. 3A and 3B, which will be explained later.

Based on these considerations, the module 24 for managing the writing of data is designed to write data, or otherwise block its writing, in the circular buffer memory 16 according to the values of the read and write pointers PL and PE. It is also designed to update the write pointer PE, either automatically using a sequencer by incrementing an elementary location or in a predetermined manner by executing firmware 40 that may, for example, be stored on the same storage medium as the circular buffer memory 16. More specifically, in a simple embodiment of the invention, a piece of data to be written in the circular buffer memory 16 must be written to the address indicated by the write pointer PE; its writing must be blocked if an update to the write pointer PE previously carried out by the module 24 for managing writing causes the address to which it points to reach or surpass the address to which the read pointer PL points (full memory).

Based on these same considerations, the module 30 for managing the reading of data is designed to read data, or otherwise block its reading, in the circular buffer memory 16 according to the values of the read and write pointers PL and PE. It is also designed to update the read pointer PL, either automatically using a sequencer by incrementing an elementary location or in a predetermined manner by executing firmware 40 that may, for example, be stored on the same storage medium as the circular buffer memory 16. More specifically, in a simple embodiment of the invention, a piece of data to be read in the circular buffer memory 16 must be read at the address indicated by the read pointer PL; its reading must be blocked if an update to the read pointer PL previously carried out by the module 30 for managing reading causes the address to which it points to reach or surpass the address to which the write pointer PE points (empty memory).

Specifically, for blocking and unblocking reading and writing in the circular buffer memory 16 as indicated above, the module 24 for managing writing can be programmed to do the following after each update to the write pointer PE:

block any data from being written to the circular buffer memory 16 if the write pointer PE reaches the read pointer PL (indicating that the memory is full), and unblock data from being read in the circular buffer memory 16 if it was blocked and the write pointer PE surpasses the read pointer PL.

Similarly, the module 30 for managing reading can be programmed to do the following after each update to the read pointer PL:

block any data from being read in the circular buffer memory 16 if the read pointer PL reaches the write pointer PE (indicating that the memory is empty), and unblock data from being written to the circular buffer memory 16 if it was blocked and the read pointer PL surpasses the write pointer PE.

In this way, the module 24 for managing writing serves to block writing when the memory 16 is full and to unblock reading when the empty memory fills up again. The module 30 for managing reading serves to block reading when the memory 16 is empty and to unblock writing when the full memory empties again.

The operation detailed above for the modules 24 and 30 for managing writing and reading is only one example of implementing means of blocking reading and writing in the circular buffer memory 16 using read and write pointers PL and PE, but, as is known to those skilled in the art, there are other possible implementations or embodiments for making the circular buffer memory 16 block reading and writing based on the value of the read and write pointers PL and PE.

These characteristics make the DMA controller 10 or 20 capable of synchronizing the incoming data flow from the source 12 and the outgoing flow toward the destination 14.

The result is an advantage illustrated in FIG. 2. In this figure, an integrated circuit 50 comprises a microprocessor 52, the data source 12 that may be a local memory for temporarily storing data that is processed or used by the microprocessor 52, the destination 14 that may be any functional operator or peripheral device, and the DMA controller according to its embodiment 20 including the circular buffer memory 16. All of these elements 52, 12, 14, and 20 are connect together by means of a conventional data transmission bus 54.

Under normal operation of the microprocessor 52 and the DMA controller 20, the microprocessor transfers data to the source 12 (step B), such as to its buffer memory, independently of the transfers carried out by the DMA controller between the source 12 and the destination 14 (step C). This is made possible by the synchronization function that may be performed by the DMA controller 20, as described above, using its circular buffer memory 15 for blocking reading and writing.

However, if the DMA controller 20 cannot perform this function, a standard request (step A) and acknowledgment (step D) protocol should be implemented between the microprocessor 52 and the DMA controller 20, involving blocks of data being written between the microprocessor 52 and the source 12. The data transfer between the source 12 and the destination 14 should then be carried out using the following procedure:

transmission A by the microprocessor 52 of a request to transfer a block of data to the DMA controller, transmission B of the block of data from the microprocessor 52 to the identified buffer memory in the source 12, transfer C of the block of data by the DMA controller from the source 12 to the destination 14, transmission D by the DMA controller of an acknowledgment to the microprocessor 52 to allow another block of data to be sent.

It therefore clearly appears that the DMA controller 20 such as described above, providing synchronization with each transferred piece of data, can simplify the data transfer steps, particularly by skipping steps A to D.

In combination with this synchronization function, it is possible in one embodiment of the invention to provide firmware (for example, the firmware 40) to update at least one of the read and write pointers associated with the circular buffer memory 16 according to a predetermined update logic to add flexibility to the reading and writing operations. In this case, in order to not lose the ability to synchronize of the DMA controller 10 or 20, a new read or write pointer, called a work pointer and having the reference PT in FIGS. 3A and 3B, must be defined. This work pointer is different from the read and write pointers PL and PE defined above. Like them, it is stored in the storage medium 38. It is variable and intended to be updated by the firmware 40 after each reading or writing operation that it performs.

Specifically, the firmware 40 can be set up so that the logic for updating the work pointer PT comprises at least one address jump in the circular buffer memory 16. By introducing this new pointer PT and the associated firmware 40, which allows it to move forward or backward by address jumps, for example, as illustrated in FIG. 3A, within the circular buffer memory 16, in which the DMA controller 10 or 20 manages the reads and writes, the circular buffer memory 16 is not used as a simple FIFO list. It allows the DMA controller 10 or 20 to reorder the sequence of data to be transferred between the source 12 and the destination 14.

In a preferred embodiment, the work pointer TP is a read pointer.

In this embodiment, the first read pointer PL is a read pointer that releases memory space for writing data. In other words, each time it is updated, the memory space contained between the location of the formerly pointed address and the location preceding the new address to which the first read pointer PL points is automatically released for writing. This is because, as noted above, the memory space in the circular buffer memory 16 between the address of the write pointer PE and the address preceding that of the read pointer PL, going from the bottom to the top, is considered, by principle to be a free space for writing.

The work pointer PT is a read pointer for preserving read data. In other words, when a piece of data must be read in the circular buffer memory 16 to be transmitted to the destination 14, it is read at the address indicated by the work pointer PT, but the update to the work pointer PT after this reading does not release the corresponding elementary location for writing. The reading movements of the work pointer PT are not necessarily in increments. They are freely predetermined by the firmware 40 in an arbitrary order, preferably between the first read pointer PL and the write pointer PE. Depending on the application, data read once by the work pointer PT can be read again, and the data can be read in an order that is different from the order in which it is stored in the circular buffer memory 16. Therefore only an update to the first read pointer can release the memory space.

For example, in a video data flow transmission application using the MPEG2 or 4 standard ("Moving Picture Expert Group"), for eight lines of video coefficients stored in the circular buffer memory 16, the firmware 40 may include instructions for moving the work pointer PT from macroblock 8×8 to macroblock 8×8 in an order that is predetermined in each macroblock. When all of this eight-line macroblocks have been read by the work pointer PT, the eight lines of video coefficients are then released in the buffer memory by a microprogrammed update to the first read pointer PL.

Note that, in this embodiment where the work pointer PT is a read pointer, the firmware 40 comprises instructions, executed by the module 30 for managing reads for updating the two read pointers:
  instructions that may include forward and/or backward address jumps, depending on the intended application for the work pointer PT,
  instructions that may include only forward address jumps, depending on the locations programmed for the work pointer PT, for the first read pointer PL.

However, the firmware 40 does not include instructions for updating the write pointer PE, which could be updated by a sequencer, without an address jump, incrementally with each operation to write data to the circular buffer memory 16.

Note also that, as illustrated in FIG. 3A, the movements of the work pointer PT must be programmed so that it points to the area of the circular buffer memory 16 that includes the data to be read. If, after an update, it points outside of this area, as illustrated in FIG. 3B, then it can be set up, depending on the intended applications, either to generate an error message or to block this position until the write pointer PE catches up to it.

In a symmetrical embodiment to the above, the work pointer PT can be a write pointer.

In this second embodiment, the write pointer PE is a write pointer that releases memory space for writing data to the circular buffer memory 16. In other words, each time it is updated, the memory space contained between the location of the formerly pointed address and the location preceding the new address to which this write pointer PE points is automatically reserved for reading.

The work pointer PT is a write pointer for writing data in any predetermined order in the memory space reserved by the pointer PE. In other words, when data must be written in the circular buffer memory 16, it is at the address indicated by the work pointer PT, whose update does not necessarily follow an incremental logic. Its movements are freely predetermined by the firmware 40 in an arbitrary order in the reserved memory space.

Note that, in this second embodiment where the work pointer PT is a write pointer, the firmware 40 comprises instructions, executed by the module 24 for managing writes for updating the two write pointers:
  instructions that may include forward and/or backward address jumps, depending on the intended application for the work pointer PT,
  instructions that may include only forward address jumps, depending on the locations programmed for the work pointer PT, for the write pointer PE.

However, the firmware 40 does not include instructions for updating the read pointer PL, which could be updated by a sequencer, without an address jump, incrementally with each operation to read data to the circular buffer memory 16.

Moreover, alternatively, the direct memory access controller comprises both a write work pointer and a read work pointer.

The direct memory access controller then comprises means for updating the write work pointer after each write that is performed and means for updating the read work pointer after each read that is performed, using a predetermined update logic for each work pointer and specifically a logic that may comprise movements by forward and/or backward address jumps in the circular buffer memory. As explained above, the movements of the read pointer must be programmed so that it points to the area of the circular buffer memory that is reserved for reading (area defined from the read pointer PL to the address preceding the write pointer PE). Similarly, the movements of the write work pointer must be programmed so that it points to the area of free memory for writing (area defined from the write pointer PE to the address preceding the read pointer PL).

An example of a data transfer method that can be implemented by the DMA controller 10 or 20 will now be explained, in the context of the first embodiment above, in which the work pointer PT is a read pointer that preserves read data. The successive steps in this method are illustrated in FIG. 4.

During a first step 100, the controller 10 or 20 is waiting for an instruction to read or write a piece of data in the circular buffer memory 16.

This step 100 is followed by a step 102 for triggering a write action, upon instruction to write data to the circular buffer memory 16. During this step for triggering a write action, the module 24 for managing writing is activated. As a non-exclusive example, it extracts the value of a first descriptor from the storage media 28 to indicate whether writing in the circular buffer memory 16 is blocked.

Then, during a test step 104, depending on the value of this first descriptor, it determines whether to continue writing the considered data. If the first descriptor indicates that writing is blocked, it returns to the step 100; otherwise, it goes to a step 106.

During the step 106, the module 24 for managing writing extracts the address to which the write pointer PE points from the storage media 28. It then executes the writing of the considered data in the corresponding elementary location.

Then, during an update step 108, the address pointed to by the write pointer PE is incremented with an elementary location in the circular buffer memory 16.

Finally, during a step 110, the module 24 for managing writing extracts, from the storage means 28, the address to which the first read pointer PL points and then possibly updates the value of the first descriptor for blocking writing and the value of a second descriptor for blocking reading, in the following situations:
  if, after the update in the step 108, the address to which the write pointer PE points reaches the address to which the first read pointer PL points (indicating that the memory 16 is full), the first descriptor for this is changed to indicate that writing is blocked,
  if, after the update in the step 108, the address to which the write pointer PE points is different than the address to which the first read pointer PL points, while the second descriptor indicates that reading is blocked, then the second descriptor for this is changed to indicate that reading is allowed.

The step 110 is followed by a return to the step 100.

The step 100 is also followed by a step 112 for triggering a read action, upon instruction to read data to the circular buffer memory 16. During this step for triggering a read action, the module 30 for managing reading is activated. As a non-exclusive example, it extracts the value of the second descriptor from the storage media 28 to indicate whether reading in the circular buffer memory 16 is blocked.

Then, during a test step 114, the module 30 for managing reads determines whether the destination 14 is ready to receive the considered data. There are several possibilities for this test. If the DMA controller 10 or 20 includes the output buffer 36, a data transfer can be performed as long as this output buffer 36 is not full. By default, a standard communication protocol can allow the destination 14 to notify the DMA controller 10 or 20 of its ability to receive data by messages in a predetermined format. If the data transfer to the destination 14 is not possible, it returns to the step 100; otherwise, it goes to another test step 116.

During this test step 116, depending on the value of the second descriptor, it is determined whether to continue reading the considered data. If the second descriptor indicates that reading is blocked, it returns to the step 100; otherwise, it goes to a step 118.

During this step 118, the module 30 for managing reading extracts the address to which the work pointer PE points from the storage media 28. It then executes the reading of the considered data in the corresponding elementary location.

Then, during an update step 120, the address pointed to by the work pointer PT is updated, either backward or forward, by one or more elementary locations, by the module 30 for managing reads based on the instructions in the firmware 40. If it is also provided by the instructions in the firmware 40, the first read pointer PL can also be updated forward by one or more elementary locations.

Finally, during a step 122, the module 30 for managing reads possibly updates the value of the first descriptor for blocking writing and the value of the second descriptor for blocking reading, in the following situations:
- if, after the update in the step 120, the address to which the first read pointer PL points reaches the address to which the write pointer PE points (indicating that the memory 16 is empty), the second descriptor for this is changed to indicate that reading is blocked,
- if, after the update in the step 120, the address to which the first read pointer PL points is different than the address to which the write pointer PE points, while the first descriptor indicates that writing is blocked, then the first descriptor for this is changed to indicate that writing is allowed.

The step 122 is followed by a return to the step 100.

A direct memory access controller according to a second embodiment of the invention is shown in FIG. 5. The elements that are the same as in the first embodiment have the same references. In this second embodiment, the purpose of the DMA controller 10 is to transfer data from the data source 12 to multiple destinations $14_1, \ldots, 14_i, \ldots, 14_n$ of this data via the buffer memory 16.

To implement the invention, the DMA controller 10 must have write access to the buffer memory 16, and optionally, it should have read access. In the example illustrated in FIG. 5, it is capable of having read and write access to data in elementary locations of the buffer memory 16 by means of the control module 18. Note that, in an alternate embodiment, the DMA controller, having the reference 20, includes the storage medium including the buffer memory 16 and the module 18 for controlling read and write access. In practice, it may be in the form of a standalone chip, such as a CMOS integrated circuit.

The DMA controller 10 or 20 sends each piece of data received from the source 12 to the buffer memory 16, each piece of data to be transmitted to one of the destinations $14_1, \ldots, 14_i, \ldots, 14_n$ then being read in the buffer memory 16 by the DMA controller 10 or 20. The buffer memory 16 thus serves as an intermediary buffer between the source 12 and the destinations $14_1, \ldots, 14_i, \ldots, 14_n$.

Note that, in another possible embodiment of the invention that is not illustrated, when the DMA controller 10 does not include the buffer memory 16 and does further not have read access to the buffer memory 16, the destinations $14_1, \ldots, 14_i, \ldots, 14_n$ will read the data addressed to them directly in the buffer memory 16. However, in this case, conventionally and not explained here, even if the data is not transmitted by the DMA controller 10, it still has a mechanism for triggering reads by the destinations.

In this second embodiment, the storage media 38 comprise, instead of the single read pointer in the first embodiment, multiple read pointers $PL1, \ldots, PLi, \ldots, PLn$, each of which is associated with a respective destination $14_1, \ldots, 14_i, \ldots, 14_n$. Each read pointer PLi points to an elementary location address in the circular buffer memory 16 where the next piece of data can be read in order to be transmitted to the destination $14_i$.

Because the buffer memory 16 is a circular memory whose size is defined by the number of elementary locations between the bottom and top addresses, designated by the pointers PB and PS, each elementary location in this memory, to which the read and write pointers $PL1, \ldots, PLi, \ldots, PLn$ and PE may point, is identified by an address between the bottom address and the top address.

The bottom and top pointers PB and PS are predetermined and intended to remain constant, while the write pointers PE and read pointers $PL1, \ldots, PLi, \ldots, PLn$ are variable. They can be updated by incrementation, with or without address jumps defining an update direction.

The write pointer PE is, for example, more specifically intended to be updated by incrementing an elementary location, from the bottom to the top, following a writing operation in the circular buffer memory.

However, the read pointers $PL1, \ldots, PLi, \ldots, PLn$ are updated respectively by executing firmwares $40_1, \ldots, 40_i, \ldots, 40_n$. Their update is predetermined so that each read pointer PLi points to an elementary location that stores a piece of data that is intended to be transferred to the corresponding destination $14_i$. The firmwares $40_1, \ldots, 40_i, \ldots, 40_n$ can be stored on the same storage media as the circular buffer memory 16. They are usually executed by a module for managing reads in the circular buffer memory 16, which is internal or external to the DMA controller. In the example in FIG. 5, they are more specifically executed by the module 30 for managing reads of the DMA controller 10 or 20.

The data that is temporarily stored in the circular buffer memory 16 while waiting to be read, either by the DMA controller 10 or 20 to be transmitted to the destinations $14_1, \ldots, 14_i, \ldots, 14_n$, or directly by the destinations $14_1, \ldots, 14_i, \ldots, 14_n$, are located between the address of the read pointer PLi that has moved the least relative to the write pointer, considering the direction of the updates, and the address preceding that of the write pointer PE, going from the bottom to the top. However, the memory space in the circular buffer memory between the address of the write pointer PE and the address preceding that of the read pointer PLi that has moved the least relative to the write pointer, going from the bottom to the top, is a free space for writing. This structure for the circular buffer memory 16 associated to the descriptors PB, PS, PE, and $PL1, \ldots, PLi, \ldots, PLn$ is illustrated in FIG. 7, which will be explained later.

The advantageous operation of the direct memory access controller 10 or 20 in FIG. 5 is illustrated in FIG. 6, in a specific application that is simple but non-exclusive. According to this application, the source 12 provides a sequence of data alternating between data (white points) to be transferred to a destination $14_1$ and data (black points) to be transferred to a destination $14_2$.

Thanks to the incremental address-by-address update of the write pointer PE, this data is stored in the circular buffer memory 16 in the sequence order supplied by the source 12.

Data that is intended to be transferred to the destination $14_1$ is read in the circular buffer memory 16 by executing a firmware $40_1$ to update a read pointer PL1 that points, at every instant, to the elementary location of the next piece of data to be read for the destination $14_1$. The update logic applied by this firmware $40_1$ for the intended application is therefore to increment the read pointer PL1 by jumping an address each time data is to be read for the destination $14_1$ so as to not read data assigned to the destination $14_2$.

Similarly, data that is intended to be transferred to the destination $14_2$ is read in the circular buffer memory 16 by executing a firmware $40_2$ to update a read pointer PL2 that points, at every instant, to the elementary location of the next piece of data to be read for the destination $14_2$. The update logic applied by this firmware $40_2$ is also to increment the read pointer PL2 by jumping an address each time data is to be read for the destination $14_2$ so as to not read data assigned to the destination $14_1$.

Because the two firmwares $40_1$ and $40_2$ are independent and can therefore be executed in parallel by the DMA controller 10 or 20, blocking either of the two, notably because the corresponding destination is blocked for reading, has no effect on the other. It is therefore clear that the DMA controller is thus capable of easily and effectively transferring data to multiple destinations without any one of them singlehandedly blocking the full data transfer.

In combination with this function of transferring without blocking by one of the destinations, it is possible in a particular embodiment of the invention for the DMA controller to also synchronize incoming and outgoing flows.

To implement this particular embodiment, it is necessary for the DMA controller to comprise the module 30 for managing reads, defined above. In this case, this module 30 for managing reads can be programmed to:
  select, from all of the read pointers PL1, PLi, PLn, the noted read pointer PLS that indicates the elementary location that has moved the least relative to the elementary location indicated by the write pointer PE, considering the predetermined update direction, and
  carry out this selection at each update of any of the read pointers PL1, . . . , PLi, . . . , PLn following a reading of data by any one of the destinations.

Based on these considerations, the module 24 for managing the writing of data is designed to allow or block the writing of data in the circular buffer memory 16 according to the relative values of the write pointer PE and the selected read pointer PLS. It is also designed to update the write pointer PE automatically using a sequencer by incrementing it by one elementary location. More specifically, in a simple variant of this particular embodiment of the invention, a piece of data to be written in the circular buffer memory 16 must be written to the address indicated by the write pointer PE; its writing must be blocked if an update to the write pointer PE previously carried out by the module 24 for managing writing causes the address to which it points to reach or surpass the address to which the selected read pointer PLS points (full memory).

Based on these same considerations, the module 30 for managing the reading of data is designed to allow or block the reading of data in the circular buffer memory 16 according to the relative values of the write pointer PE and the selected read pointer PLS. It is also designed to update each read pointer PLi by executing each firmware $40_i$. More specifically, in a simple variant of this particular embodiment of the invention, a piece of data to be read in the circular buffer memory 16 for a destination $14_i$ must be read at the address indicated by the read pointer PLi; its reading must be blocked if an update to the read pointer PLi previously carried out by the module 30 for managing reading causes the address to which the selected read pointer PLS points to reach or surpass the address to which the write pointer PE points (empty memory).

Specifically, for blocking and unblocking reading and writing in the circular buffer memory 16 as indicated above, the module 24 for managing writing can be programmed to do the following after each update to the write pointer PE:
  block any data from being written to the circular buffer memory 16 if the write pointer PE reaches the selected read pointer PLS (indicating that the memory is full), and
  unblock data from being read in the circular buffer memory 16 if it was blocked and the write pointer PE surpasses the selected read pointer PLS.

Similarly, the module 30 for managing reading can be programmed to do the following after each update to a read pointer PLi:
  block any data from being read in the circular buffer memory 16 if the selected read pointer PLS reaches the write pointer PE (indicating that the memory is empty), and
  unblock data from being written to the circular buffer memory 16 if it was blocked and the selected read pointer PLS surpasses the read pointer PE.

In this way, the module 24 for managing writing serves to block writing when the memory 16 is full and to unblock reading when the empty memory fills up again. The module 30 for managing reading serves to block reading when the memory 16 is empty and to unblock writing when the full memory empties again.

The functionality described above for the modules 24 and 30 that manage reading and writing is only an example of implementing means for blocking reading and writing in the circular buffer memory 16 using read and write pointers PL1, . . . , PLi, . . . , PLn and PE. But it is known to those skilled in the art that other implementations or variants are possible for making the circular buffer memory 16 block reading and writing based on the value of the read and write pointers PL1, . . . , PLi, . . . , PLn and PE.

These characteristics make the DMA controller 10 or 20 capable of synchronizing the incoming data flow from the source 1012 and the outgoing flows to the destinations $14_1, \ldots, 14_i, \ldots, 14_n$.

As a result, in an integrated circuit comprising a microprocessor, the data source 12 that may be a local memory for temporarily storing data that is processed or used by the microprocessor, the destinations $14_1, \ldots, 14_i, \ldots, 14_n$ that may be any functional operator or peripheral device, and the DMA controller, according to its embodiment 20, including the circular buffer memory 16, the microprocessor can transfer data to the source 12 independently of transfers carried out by the DMA controller between the source 12 and the destinations $14_1, \ldots, 14_i, \ldots, 14_n$.

In combination with this DMA controller synchronization function, according to a first embodiment, a new read pointer, called a "work pointer" is defined for each destination $14_i$. For each destination $14_i$, this work pointer is different than the read pointer PLi defined above. Like it, it is stored in the storage medium 38. It is variable and intended to be updated by the firmware $40_i$ after each reading operation that it performs. In FIG. 7, which illustrates a simple embodiment with two destinations $14_1$ and $14_2$, two work pointers PT1 and PT2 are added to the write pointer PE and to the read pointers PL1 and PL2.

The firmware $40_i$ is thus defined so that the update logic of the work pointer PTi makes it possible to read data intended for the destination $14_i$ in an order other than the sequence transmitted by the source 12. By introducing this new pointer PTi for each destination $14_i$ and the ability to update by forward or and backward address jumps, as illustrated in FIG. 7, in the circular buffer memory 16 and more specifically in the list of data assigned to the destination $14_i$, this is not used as a simple FIFO list. The work pointers PT1, ..., PTi, ..., PTn allow the DMA controller 10 or 20 to reorder each sequence of data to be transferred between the source 12 and any one of the destinations $14_1, \ldots, 14_i, \ldots, 14_n$.

In this first embodiment, the selected read pointer PLS is then a read pointer that releases memory space for writing data. In other words, when one of the read pointers is selected as the selected read pointer, the memory space between the location of the formerly pointed address and the location preceding that of the new address to which the selected read pointer PLS points is automatically released for writing. This is because, as noted above, the memory space in the circular buffer memory 16 between the address of the write pointer PE and the address preceding that of the selected read pointer PLS, going from the bottom to the top, is considered, by principle to be a free space for writing.

In the simple example in FIG. 7, the read pointer PL1 has moved the least relative to the write pointer PE. It is therefore selected and also used as a reference for defining the start of the memory space storing the data before it is read and transferred to the destinations. More specifically, the memory space marked as reference A designates a memory area containing the data assigned to the destination $14_1$ that has not yet been read and the data assigned to the destination $14_2$ that has been read. This area is not yet free for writing. The memory space marked by reference B designates a memory area containing the data assigned to the destinations $14_1$ and $14_2$ that has not yet been read. This area is certainly not free for writing either.

Each work pointer PTi is a read pointer for preserving read data. In other words, when a piece of data must be read in the circular buffer memory 16 to be transmitted to the destination $14_i$, it is read at the address indicated by the work pointer PTi, but the update to the work pointer PTi after this reading does not release the corresponding elementary location for writing. Movements for reading the work pointer PTi do not necessarily follow the sequence of data assigned to the destination $14_i$ in ascending order of addresses. They are freely predetermined by the firmware $40_i$ in an arbitrary order, preferably between the read pointer PLi and the write pointer PE. Depending on the application, data read once by the work pointer PTi can be read again, and the data can be read in an order that is different from the order in which it is stored in the circular buffer memory 16.

Note that, in this embodiment where each work pointer PTi is a read pointer, each firmware $40_i$ comprises instructions, executed by the module 30 for managing reads for updating the two read pointers associated to the destination $14_i$:

instructions that may include forward and/or backward address jumps, depending on the intended application for the work pointer PTi, instructions that may include only forward address jumps, depending on the addresses for the data assigned to the destination $14_i$ and depending on the locations programmed for the work pointer PTi, for the read pointer PLi.

However, none of the firmwares $40_1, \ldots, 40_i, \ldots, 40_n$ includes instructions for updating the write pointer PE, which could be updated by a sequencer, without an address jump, incrementally with each operation to write data to the circular buffer memory 16.

Note also that, as illustrated in FIG. 7, the movements of the work pointers PT1, ..., PTi, ..., PTn must be programmed so that they point to the area of the circular buffer memory 16 that includes the data to be read, respectively, for the destinations $14_1, \ldots, 14_i, \ldots, 14_n$. If, after an update, either one of them points outside of this area, then it can be set up, depending on the intended applications, either to generate an error message or to block this position until the write pointer PE catches up to it. According to the invention, this blocks the execution of the firmware $40_i$ corresponding to the blocked work pointer PTi, but it does not block the execution of any other firmware $40_j$ associated to another destination $14_j$.

In a symmetrical embodiment to the above, in order to reorder the sequence of data, a single work pointer PT is defined as a write pointer.

In this second embodiment, the write pointer PE is a write pointer that releases memory space for writing data to the circular buffer memory 16. In other words, each time it is updated, the memory space contained between the location of the formerly pointed address and the location preceding the new address to which this write pointer PE points is automatically reserved for reading. The work pointer PT is a write pointer for writing data in any predetermined order in the memory space reserved by the pointer PE.

But this second embodiment is less attractive than the previous one because it might involve some blocking of the writing of data in the circular buffer memory 16. However, in an application in which data is transferred by a DMA controller, it is preferable to have blockings later, when reading in the circular buffer memory, rather than earlier, when writing.

An example of a method for transferring data to multiple destinations $14_i$ will now be explained, in the context of the first embodiment above, in which the DMA controller blocks reading and writing in the circular buffer memory 16 and in which work pointers PT1, ..., PTi, ..., PTn are introduced as read pointers for preserving read data. The successive steps in this method are illustrated in FIG. 8.

All of the steps are the same as in FIG. 4, except that the steps 112 to 122 are carried out for each work pointer PT1, ..., PTi, ..., PTn, and are thereby referenced $112i \ldots 122i$. More specifically, each firmware $40_i$ provides for the execution of the steps $112i$ to $122i$, knowing that multiple firmwares can be executed in parallel, with none of them blocking any of the others when itself blocked.

Moreover, it is not essential for each destination to have a pointer PTi to be associated to a read pointer PLi; a single read pointer PL can be used. In this case, as in the case where a single read work pointer is used, the movements of each read work pointer must be programmed so that it points into the area of the circular buffer memory that is reserved for reading (area defined from the read pointer PL to the address preceding the write pointer PE).

Symmetrically, a single write pointer PE can be used if multiple write work pointers PTi are used for different sources. The movements of each write work pointer are then programmed so that they point to the area of free memory for writing (area defined from the write pointer PE to the address preceding the read pointer PL).

It is clear that the direct memory access controller described above and its data transfer functionality not only allow to avoid a specific synchronization between a microprocessor and its associated controller, but also add flexibility to the data transfer, particularly when the destination wants a data sequence that does not match what is provided by the source. This is, for example, a useful property in applications involving processing and transferring image or video data, such as with MPEG standards.

Also note that the invention is not limited to the considered embodiments.

Specifically, in the above, to simplify the description, an application is considered where the transfer is done from a single source to a single destination, but the principle of the invention applies in the same manner with multiple sources and/or multiple destinations. Similarly, a direct memory access controller according to the invention can support multiple circular buffer memories and therefore multiple sets of associated descriptors (pointers, blocking descriptors, etc.)

Moreover, the direct memory access controller could also manage, as described above, one or more write pointers PE and one or more read pointers PL, and also multiple read and/or write work pointers PT.

More generally, as is known to those skilled in the art, there are various modifications that can be made to the embodiments described above, with respect to the instruction that has been disclosed. In the following claims, the terms used should not be interpreted as limiting the claims to the embodiments presented in this description, but should be interpreted to include all of the equivalents that the claims intend to cover by their formulation and whose projection is within reach of those skilled in the art by applying their general knowledge to the instruction that has just been disclosed.

The invention claimed is:

1. A direct memory access controller for transferring data from at least one data source to at least one destination, via a circular buffer memory, the direct memory access controller comprising:
   circuitry configured to
   manage writing to write data received from said at least one source in the circular buffer memory,
   store a first read pointer and a first write pointer, said first read pointer and said first write pointer, respectively, indicating an elementary location in the circular buffer memory where data can be read or written,
   manage reading to read data stored in the circular buffer memory and transfer the read data to said at least one destination,
   block reading and writing, respectively, in the circular buffer memory based on the elementary locations indicated by said first read pointer and said first write pointer,
   store a read or write work pointer, different from said first read pointer and said first write pointer, and
   update the read or write work pointer, after each read or write carried out by said read or write work pointer, according to a predetermined update logic,
   wherein the predetermined update logic comprises forward and backward movements of said read or write work pointer inside the circular buffer memory, and
   wherein the circuitry is configured to block said read or write work pointer:
   in a case of said read or write work pointer being a read work pointer that points outside a memory space reserved for reading defined from the first read pointer to an address preceding the first write pointer, and
   in a case of said read or write work pointer being a write work pointer that points outside a free memory space for writing defined from the first write pointer to an address preceding the first read pointer.

2. The direct memory access controller according to claim 1, wherein the circuitry is configured to execute firmware for updating the read or write work pointer.

3. The direct memory access controller according to claim 1 or 2, wherein the predetermined update logic comprises at least one address jump in the circular buffer memory.

4. The direct memory access controller according to claim 1 or 2, wherein the circuitry is configured
   to block any data read in the circular buffer memory when an update to the first read pointer causes an address to which it points to reach or exceed an address to which the first write pointer points, and
   to block any data write in the circular buffer memory when an update to the first write pointer causes the address to which it points to reach or exceed the address to which the first read pointer points.

5. The direct memory access controller according to claim 1 or 2, wherein the first read pointer is a read pointer that releases memory space to write data, and said read or write work pointer is a read work pointer that preserves read data.

6. The direct memory access controller according to claim 2, wherein the firmware updates only the first read pointer and said read or write work pointer as a read work pointer, the first write pointer being automatically updated by incrementation, without an address jump, at each operation to write data to the circular buffer memory.

7. The direct memory access controller according to claim 1 or 2, wherein the first write pointer is a write pointer that reserves memory space for reading data, and said read or write work pointer is a write work pointer.

8. The direct memory access controller according to claim 2, wherein the firmware updates only the first write pointer and said read or write work pointer as a write work pointer, the first read pointer being automatically updated by incrementation, without an address jump, at each operation to read data in the circular buffer memory.

9. The direct memory access controller according to claim 1 or 2,
   wherein said direct memory access controller is configured to transfer data to multiple destinations,
   wherein, for each said destination, the circuitry has stored in storage circuitry thereof a read work pointer, which is different from the first read pointer, and
   wherein the circuitry is configured to
   update the read work pointer of each said destination,
   block any of said read work pointers when the read work pointer points outside of the memory space reserved for reading defined from the first read pointer to the address preceding the first write pointer.

10. The direct memory access controller according to claim 1 or 2,
    wherein said direct memory access controller is configured to transfer data to multiple destinations,
    wherein, for each said destination, the circuitry has stored in storage circuitry thereof a corresponding said first read pointer associated to a corresponding said read or write work pointer as a read work pointer, wherein the circuitry is configured to block any of said read work pointers when the read work pointer points outside of the memory space reserved for reading defined from the first read pointer, associated to the considered read work pointer, to the address preceding the first write pointer.

11. The direct memory access controller according to claim 1 or 2,
wherein said direct memory access controller is configured to transfer data from multiple sources,
wherein, for each said source, the circuitry has stored in storage circuitry thereof said read or write work pointer as a write work pointer, which is different from the first write pointer, and
wherein the circuitry is configured to block any of said write work pointers when the write work pointer points outside of the free memory space for writing defined from the first write pointer to the address preceding the first read pointer.

12. The direct memory access controller according to claim 1 or 2,
wherein said direct memory access controller is configured to transfer data from multiple sources,
wherein, for each said source, the circuitry has stored in storage circuitry thereof a corresponding said first write pointer, associated to a corresponding said read or write work pointer as a write work pointer, and
wherein the circuitry is configured to block any of said write work pointers when the write work pointer points outside of the free memory space for writing defined from the first write pointer associated to the considered write work pointer, to the address preceding the first read pointer.

13. The direct memory access controller according to claim 1 or 2, wherein the circuitry has stored in storage circuitry thereof said read or write work pointer as a write work pointer, which is different from the first write pointer, and another read or write work pointer as a read work pointer, which is different from the first read pointer.

14. The direct memory access controller according to claim 1 or 2, wherein the predetermined update logic comprises forward and backward movements of said read or write work pointer in the circular buffer memory.

15. A method for transferring data from at least one data source to at least one destination using a direct memory access controller according to claim 1 or 2, the method comprising:
each data received from the at least one data source being sent by the direct memory access controller to a circular buffer memory,
each data to be transmitted to the at least one destination being read in the circular buffer memory by the direct memory access controller,
blocking reading and writing, respectively, by the direct memory access controller in the circular buffer memory based on relative elementary locations indicated by the first read and write pointers,
movements of the read or write work pointer forward and backward in the circular buffer memory,
blocking of the read or write work pointer when said read or write work pointer being a read work pointer points outside of the memory space reserved for reading and defined from the first read pointer to the address preceding the first write pointer, or respectively, when said read or write work pointer being a write work pointer points outside of the free memory space for writing defined from the first write pointer to the address preceding the first read pointer.

16. A non-transitory computer-readable storage medium storing computer-readable instructions that, when executed by a direct memory access controller, cause the direct memory access controller to perform a method for transferring data according to claim 15.

* * * * *